United States Patent [19]

Hanatsuka

[11] Patent Number: 4,935,876
[45] Date of Patent: Jun. 19, 1990

[54] KNOWLEDGE BASE MANAGEMENT METHOD AND SYSTEM

[75] Inventor: Mitsuhiro Hanatsuka, Yokohama, Japan

[73] Assignee: Hitachi, Ltd., Tokyo, Japan

[21] Appl. No.: 211,419

[22] Filed: Jun. 24, 1988

[30] Foreign Application Priority Data

Jun. 26, 1987 [JP] Japan .............................. 62-159348

[51] Int. Cl.⁵ .............................................. G06F 15/18
[52] U.S. Cl. .................................. 364/513; 364/274.3
[58] Field of Search ........................ 364/513, 200, 900

[56] References Cited

U.S. PATENT DOCUMENTS 4,752,889 6/1988 Rappaport et al. ................. 364/513
4,754,409 6/1988 Ashford et al. ..................... 364/513

OTHER PUBLICATIONS

"The Nature and Evaluation of Commercial Expert System Building Tools", William B. Geuarter, NASA Ames Research Center, Computer, 5/87.

Primary Examiner—Joseph Ruggiero
Assistant Examiner—Paul Gordon
Attorney, Agent, or Firm—Antonelli, Terry, Stout & Kraus

[57] ABSTRACT

A knowledge base management method and system provide a knowledge base file, a system control processor, a plurality of knowledge representation analyzers provided individually for knowledge representing languages or programming languages and independently of the system control processor, and a plurality of knowledge information catalogs provided individually for the programming languages and independently of the system control processor. The knowledge representation analyzer analyzes a module of knowledge inputted thereto to extract information concerning a relation (for example, relation in inheritance) between the inputted module of knowledge and another module of knowledge. The knowledge information catalog stores the information obtained through the analysis by the knowledge representation analyzer with relation to a storage location of the corresponding module of knowledge in the knowledge base file. When one module of knowledge described by any given programming language is to be stored into the knowledge base file, the module of knowledge is analyzed by one of the knowledge representation analyzers corresponding to the given programming language and information extracted from the module of knowledge by the analysis thereof is stored into one of the knowledge information catalogs corresponding to the given programming language.

7 Claims, 9 Drawing Sheets

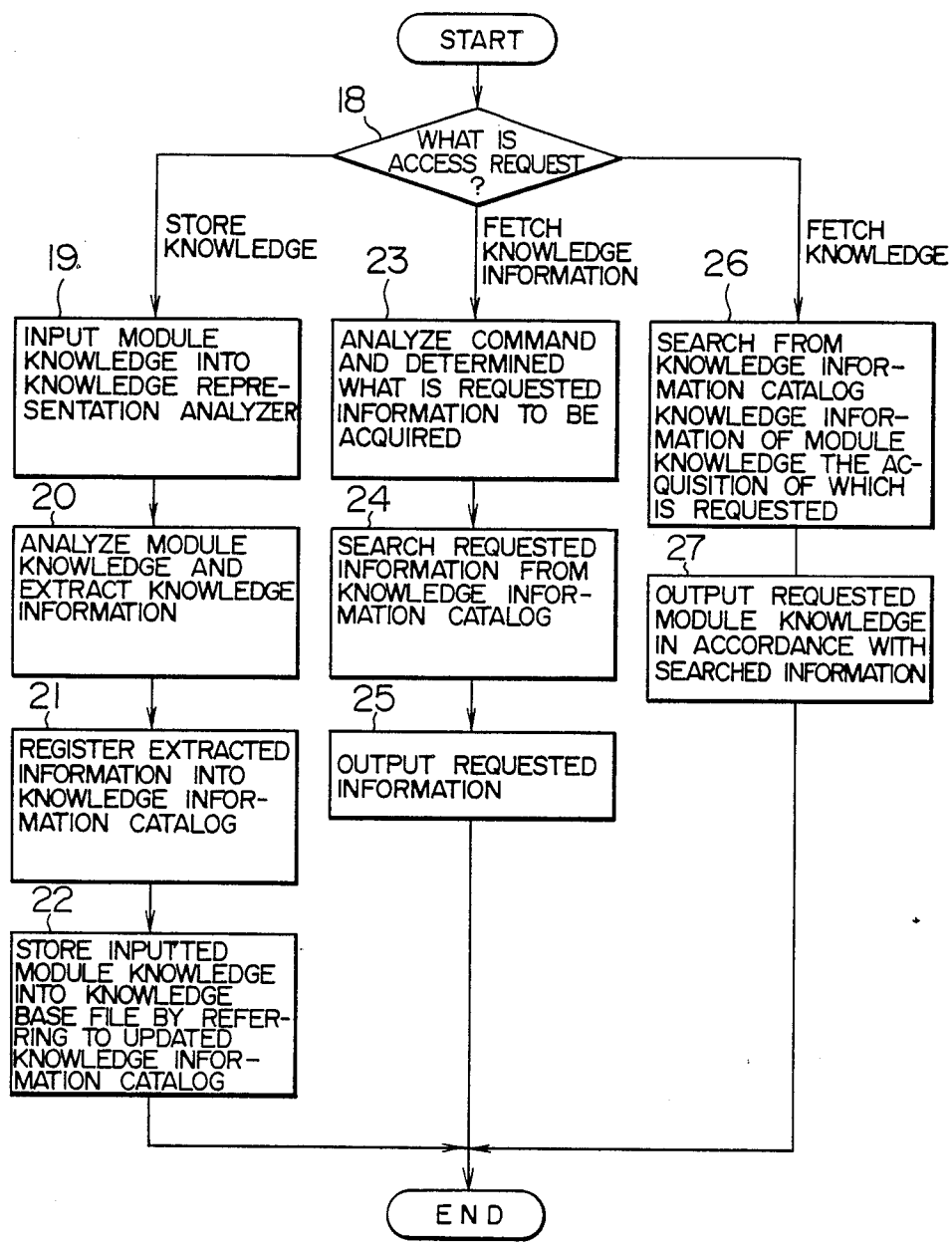

FIG. 6A

```
class   HUMAN ;  29
    comment    THIS CLASS ---- HUMAN ----
    inherit    MAMMAL  ;
    class-part  { ... 30
                    .
                    .
```

FIG. 6B

```
class   REPTILES
                32
    comment    SKIN HAS SCALES
    inherit    LIFE ;
                   33
    class-part  { ...
                    .
                    .
```

FIG. 8A

ORPHAN TABLE 44

| HIGH RANK | LOW RANK | ADDRESS IN BASE FILE 4 |
|---|---|---|
| AMPHIBIA | NEWT | • |
| AMPHIBIA | FROG | • |
| REPTILES | SNAKE | • |
| REPTILES | LIZARD | • |
|  |  |  |

FIG. 8B

ROOT TABLE 46

| HIGH RANK | LOW RANK | ADDRESS IN BASE FILE 4 |
|---|---|---|
| root | LIFE | • |
| LIFE | MAMMAL | • |
| LIFE | FISH | • |
| MAMMAL | CAT | • |
| MAMMAL | BEAR | • |
| FISH | MACKEREL PIKE | • |
| MAMMAL | HUMAN | • |
|  |  |  |

KNOWLEDGE BASE MANAGEMENT METHOD AND SYSTEM

BACKGROUND OF THE INVENTION

The present invention relates to a knowledge base management method and system for use in an expert system building tool or the like.

In an expert system building tool for structuring an expert system with a high efficiency, as the knowledge base becomes large in scale, there has been an increased need for a knowledge base management system for effectively storing and utilizing modules of knowledge the module of knowledge forming the unit of knowledge which constitutes the knowledge base. The module of knowledge may include a rule, such as an "if then" clause, a frame which represents the fact of a proposition, an object, or a formula of predictive logic which is representative of a method.

One known knowledge base management system is the a system browser in the Smalltalk-80 system disclosed in "Smalltalk-80 The Interactive Programming Environment", Japanese version, pp. 144–145. In the Smalltalk-80 system, a module of knowledge can be stored and managed with a structure or form most suitable for a given knowledge representing language (e.g. programming language). However, the Smalltalk-80 system lacks the extensibility and flexibility for use with a different programming languages, since the structure of the knowledge base as well as information indicative of the relation between modules of knowledge depending on a given programming language (for example, the relation in inheritance or succession between one and another modules of knowledge) are subordinate to the system, or since the description of knowledge must be made by a top-down method because only one programming language is fixedly employed.

SUMMARY OF THE INVENTION

An object of the present invention is to provide a knowledge base management method and system which are extensible and flexible for various knowledge representing languages or programming languages.

To that end, in a knowledge base management system according to the present invention, knowledge representation analyzers are provided for analyzing modules of knowledge or texts described by various languages representing knowledge (e.g. programming languages) and knowledge information catalogs are provided for storing information obtained through the analysis performed by the knowledge representation analyzers in related storage locations for the module of knowledge in a knowledge base file. The knowledge information catalogs are provided individually for the respective programming languages and independently of a system control processor. When one module of knowledge described by any given programming language is to be stored into the knowledge base file, the analysis of this module of knowledge is performed by one of the knowledge representation analyzers corresponding to the given programming language and information obtained by the analysis is stored into one of the knowledge information catalogs corresponding to the given programming language.

Generally, the results of analysis of a relation between different modules of knowledge will be different depending on the programming language used. Though information obtained by the analysis is stored in the form of a table and utilized for search of the knowledge base, the contents of such information as well as the storage structure thereof also will be different depending on the programming language used.

In the knowledge base management system according to the present invention, on the other hand, analysis of a relation between an input module of knowledge and a module of knowledge already stored in the knowledge base, depending on the programming language, is performed by a knowledge representation analyzer provided for that programming language. The analyzer is provided for each programming language independently of the system control processor. Information obtained by the analyzer is stored into a knowledge information catalog provided independently of the system control processor for the particular programming language involved. The information stored in the knowledge information catalog can be updated. Also, the knowledge base management system according to the present invention can easily cope with an alteration and/or extension of the programming language(s) by the exchange and/or additional provision of a knowledge representation analyzer and knowledge information catalog.

BRIEF DESCRIPTION OF THE DRAWINGS

FIG. 3 is a flow chart schematically showing the processing in the knowledge base management system;

FIGS. 6A and 6B are views showing examples of different modules of knowledge;

FIGS. 8A and 8B are views showing examples of the contents of different knowledge information catalogs.

DESCRIPTION OF THE PREFERRED EMBODIMENTS

Embodiments of the present invention will now be explained in detail with reference to the accompanying drawings.

Figure 1:
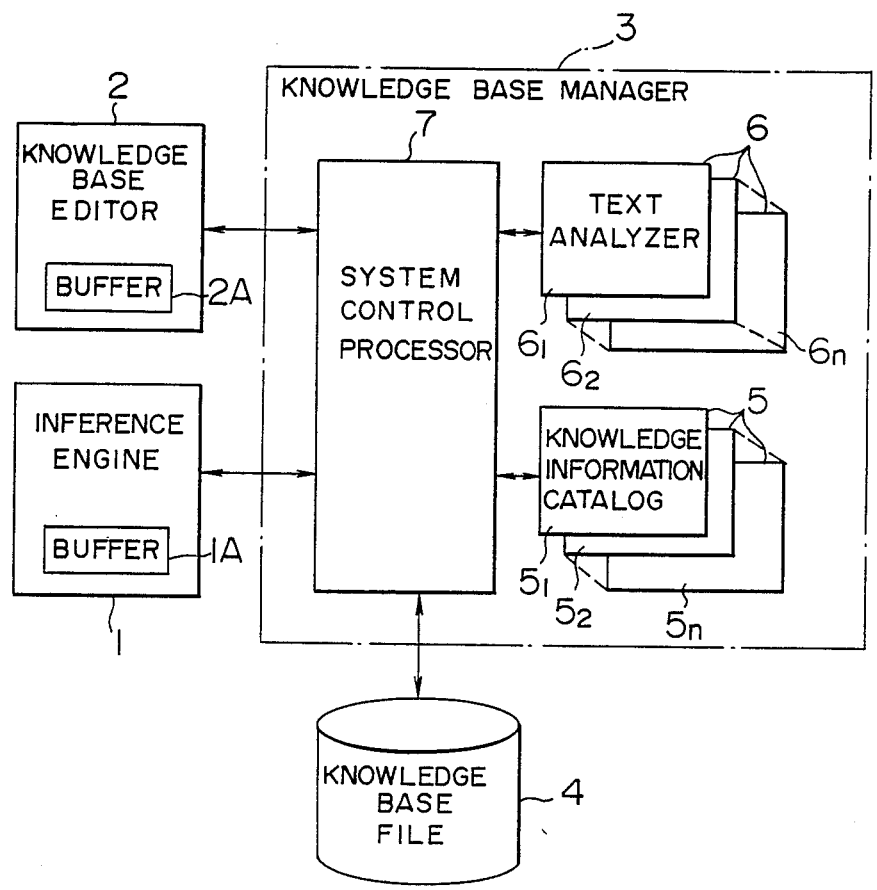
FIG. 1 shows a systematic diagram of an expert system building tool to which the present invention is applied.

FIG. 1 shows a systematic diagram of an expert system building tool to which the present invention is applied. In FIG. 1, reference numeral 1 designates an inference engine, numeral 2 a knowledge base editor, numeral 3 a knowledge base manager, and numeral 4 a knowledge base file, which may include a plurality of sub-files for respective objects or sets. The inference engine 1 and the knowledge base editor 2 each have input and output device functions.

The inference engine 1 generates an inference on knowledge described by knowledge representing languages (e.g. programming languages). The following explanation will be provided in conjunction with the case where the programming language is an object oriented programming language, by way of example. The object oriented programming language may include Smalltalk-80, or the like. The knowledge base editor 2 edits modules of knowledge. The knowledge base file 4 stores therein a group of modules of knowledge related to each other, for example, in the form of a tree structure. In other words, various modules of knowledge in the group are collectively classified and objectively stored.

The knowledge base manager 3 manages the structuring and utilization of the knowledge base file 4. In the knowledge base manager 3, a plurality of knowledge information catalogs $5_1$ to $5_n$ in the form of tables for storing knowledge relational information and a plurality of knowledge representation analyzers $6_1$ to $6_n$, generally referred to as "knowledge representation (text) analyzer 6" are provided independently of a system control processor 7 and individually for respective programming languages, such as Smalltalk-80, Prolog, Lisp and ES/KERNEL. The knowledge representation analyzer 6 analyzes a module of knowledge or text described by a certain programming language (the object oriented programming language in the present embodiment). More especially, the knowledge representation analyzer 6 is supplied with a module of knowledge described by the object oriented programming language as a language representing knowledge as shown in FIG. 6A or 6B, and performs verbal, syntactic and semantic analyses of the supplied module of knowledge to extract therefrom information concerning a relation in inheritance (succession) between that module of knowledge and another module of knowledge. The extracted information is outputted in a classified manner.

Hereinafter, information indicative of any relation between a specified module of knowledge and another module of knowledge will be referred to as intermodule-knowledge relation information or simply knowledge information.

The knowledge information catalog 5 stores, in the form of a table, intermodule-knowledge relation information (or knowledge information) KI obtained through the analysis by the knowledge representation analyzer 6 and storage locations of the corresponding module knowledge in the knowledge base file 4. The system control processor 7 performs various controls for the inputting of a module of knowledge into the knowledge representation analyzer 6, the storing and fetch or extraction of knowledge information into and from the knowledge information catalog 5, the storing and fetch of a module of knowledge into and from the knowledge base file 4, and the restructuring of the knowledge base file 4 due to the updating or restructuring of a table in the knowledge information catalog 5.

Examples of a compound for making access to the knowledge base file 4 are shown in Table 1.

TABLE 1

| NUMBER | COMMAND |
|---|---|
| ① | KPUT @BUF; |
| ② | KIGET root; |
| ③ | KIGET orphan; |
| ④ | KIGET <knowledge A>; |
| ⑤ | KIGET <knowledge A> ≦; |
| ⑥ | KIGET <knowledge A> ≧; |

TABLE 1-continued

| NUMBER | COMMAND |
|---|---|
| ⑦ | KGET <knowledge A> TO @BUF |
| ⑧ | KGET <knowledge A>* TO @BUF |

(K: Knowledge I: Information @: Address)

Referring to Table 1, a command ① is a STORE KNOWLEDGE command which causes a module of knowledge in a buffer (BUF) 1A or 2A provided in the inference engine 1 or knowledge base editor 2 to be stored into the knowledge base file 4. Commands ② to ⑥ are FETCH KNOWLEDGE INFORMATION commands. More particularly, the command ② is one for acquiring knowledge information for all modules of knowledge in the knowledge base file 4 which substantially have any relation in inheritance (succession) or hierarchy with a parent called a "root". The command ③ is one for acquiring knowledge information for all modules of knowledge in the knowledge base file 4 which substantially have no relation in inheritance with the parent. The command ④ is one for acquiring knowledge information for a module of knowledge A (specified by, for example, a class name). The command ⑤ is one for acquiring knowledge information for all of modules of knowledge in the knowledge base file 4 higher in rank than the module of knowledge A. The command ⑥ is one for acquiring knowledge information for all modules of knowledge in the knowledge base file 4 lower in rank than the module of knowledge A. Commands ⑦ and ⑧ are FETCH KNOWLEDGE commands. The command ⑦ is one for acquiring the module of knowledge A (entity) into the buffer 1A or 2A. The command ⑧ is one for acquiring any module of knowledge entity having any relation with the module of knowledge A into the buffer 1A or 2A. The above-mentioned commands are prepared for each of programming languages used.

With the commands as mentioned above, each of the inference engine 1 and the knowledge base editor 2 can make access through the knowledge base manager 3 to the knowledge base file 4 in units of one module of knowledge or in units of more than one module of knowledge having any relation with a specified module of knowledge.

Figure 2:
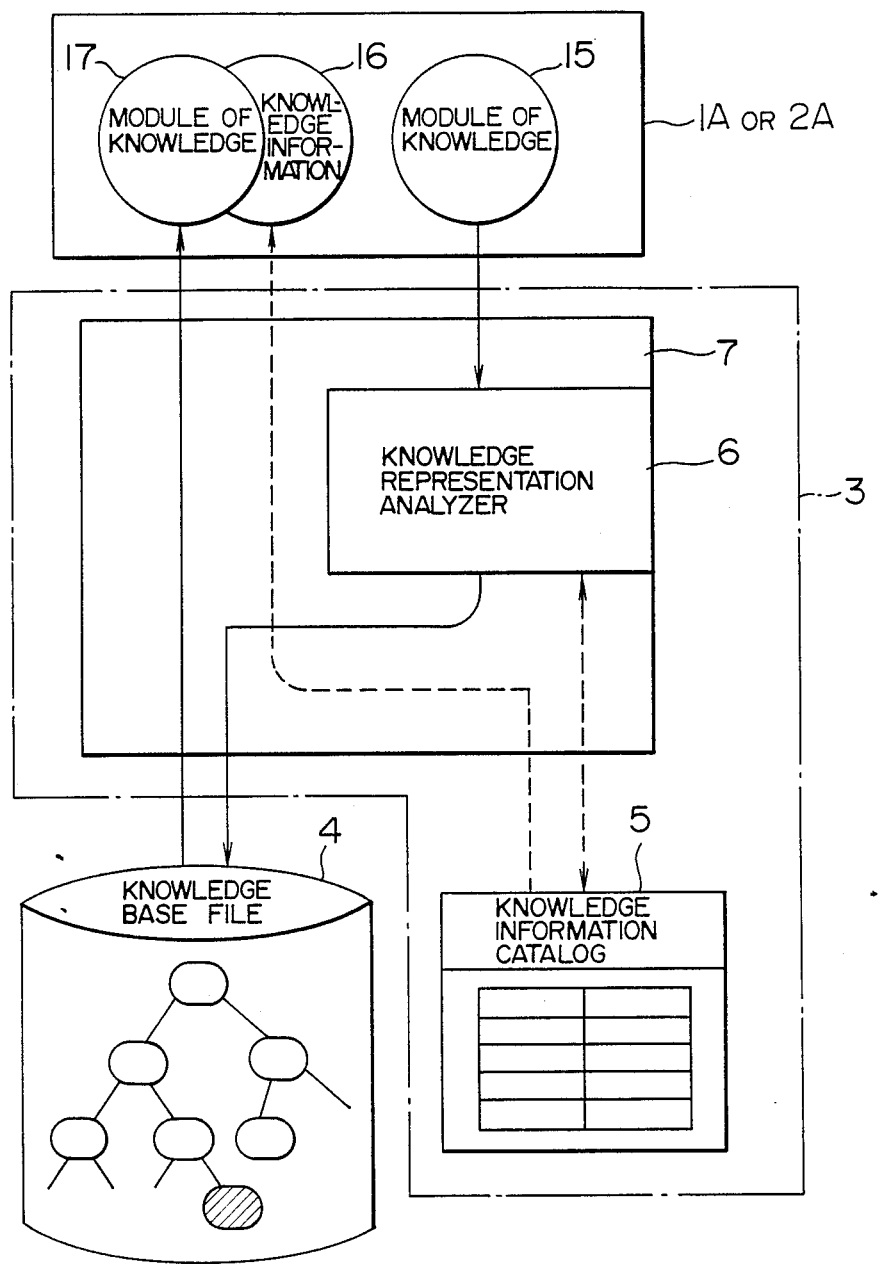
FIG. 2 is a view for explaining a process performed by a knowledge base management system in the expert system building tool.

Next, the outline of processing performed in the knowledge base manager 3 when access to the knowledge base file 4 is made will be explained with reference to FIGS. 2 and 3. FIG. 2 is a view for explaining the flow of a module of knowledge and knowledge information mainly in the knowledge base manager 3 and FIG. 4 shows a flow chart of the processing performed in the knowledge base manager 3.

Upon receipt of an access request from the knowledge base editor 2 or the inference engine 1 by virtue of a command as shown in Table 1, the system control processor 7 in the knowledge base manager 3 judges whether the command is an access request of either STORE KNOWLEDGE, FETCH KNOWLEDGE INFORMATION or FETCH KNOWLEDGE (see step 18 in FIG. 3).

In the case where the command is a STORE knowledge command, i.e. the command ① shown in Table 1, the system control processor 7 supplies module knowledge 15 inputted into the buffer 2A of knowledge base editor 2 or the buffer 1A of the inference engine 1 to one of the knowledge representation analyzers 6 corresponding to a programming language by which the module of knowledge 15 is described (see step 19 in FIG. 3). The knowledge representation analyzer 6 analyzes the inputted module of knowledge 15 and extracts intermodule-knowledge relation information or knowledge information therefrom (see step 20). In the present embodiment, information indicative of a relation in inheritance or hierarchy between one and another module of knowledge is extracted, as has already mentioned. Thereafter, the system program processor 7 operates so that the knowledge information extracted from the module of knowledge 15 is registered together with a storage location of the module of knowledge 15 in the knowledge base file 4 into one of the knowledge information catalogs 5 corresponding to the programming language of the module of knowledge 15 (see step 21) and the module of knowledge 15 is stored into the knowledge base file 4 (see step 22).

In the case where the command is a FETCH knowledge INFORMATION command, such as any one of the commands ② to ⑥ shown in Table 1, the system control processor 7 analyzes the command to determine what is the requested information to be acquired (see step 23 in FIG. 3). Next, the system control processor 7 operates to search for the requested information in one of the knowledge information catalogs 5 corresponding to a programming language for which the command under consideration is prepared (see step 24) and to deliver the requested information (knowledge information) 16 acquired by the search to a requester (see step 25).

In the case where the command is a FETCH KNOWLEDGE command, such as one of the commands ⑦ and ⑧ shown in Table 1, the system control processor 7 operates so that knowledge information of a requested module of knowledge is searched for in one of the knowledge information catalogs 5 corresponding to the programming language by which the requested module of knowledge is described (see step 26 in FIG. 3). The requested module of knowledge 17 is fetched from the knowledge base file 4 in accordance with a pointer (or module of knowledge storage address) in a record of the knowledge information searched and is delivered to a requester (see step 27).

Next, the knowledge storing process briefly mentioned above will be explained in detail.

Figure 4A:
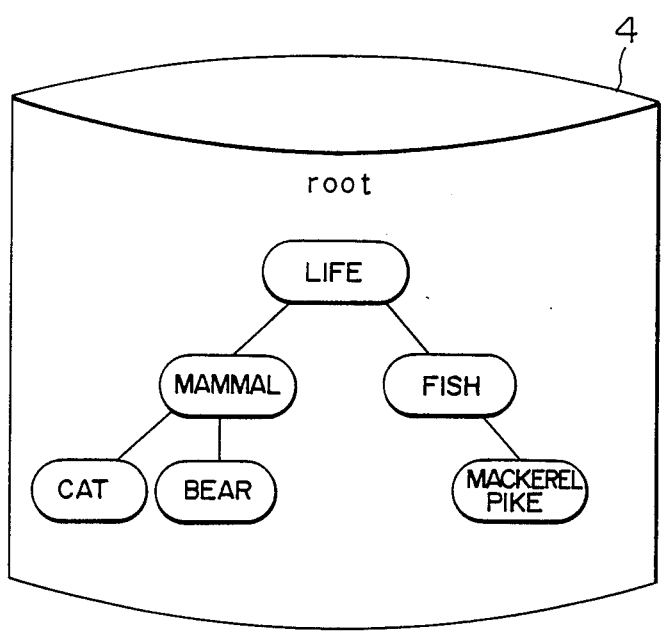
FIGS. 4A and 4B are views showing examples of the structure of a knowledge base file before and after a change thereof.
Figure 5A:
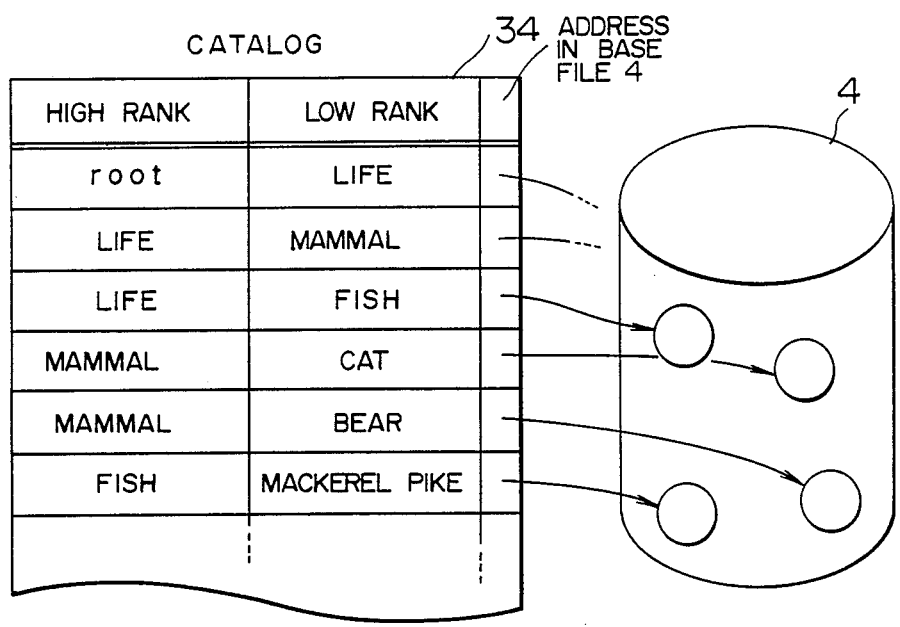
FIGS. 5A and 5B are views showing examples of the contents of a knowledge information catalog before and after a change thereof.

Assume that a relation in inheritance or hierarchy between one and another module of knowledge in the knowledge base file 4 is as shown in FIG. 4A. In that case, the contents of the knowledge information catalog 5 are provided in the form of a table 34 shown in FIG. 5A. The table 34 is an information table for a group of modules of knowledge having any relation in inheritance with a parent called a "root". The table 34 is termed a root table. The root table 34 has a first (or high rank) column in which an inherit object name is stored, a second (low rank) column in which a class name is stored, and a third column in which a storage address of the entity (module of knowledge) of the corresponding class in the knowledge base file 4 is stored.

Figure 5B:
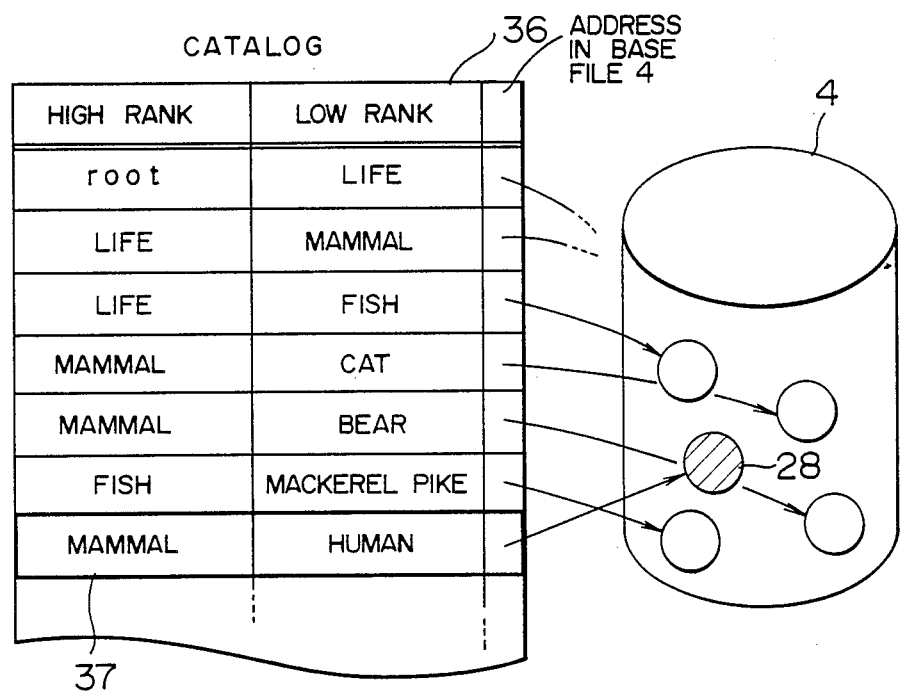

Now, consider the case where a module of knowledge 28 having the contents as shown in FIG. 6A is to be stored into the knowledge base file 4 when the knowledge base file 4 and the knowledge information catalog 5 are in their states as mentioned above. In such a case, the knowledge representation analyzer 6 in the knowledge base manager 3 extracts knowledge information or intermodule knowledge hierarchical relation information from the module of knowledge 28. As for this module of knowledge 28, a class name 29 of "human" and an inherit object name 30 of "mammal" are extacted. The system control processor 7 in the knowledge base manager 3 operates to register the extracted class name and inherit object name together with a storage address of the module of knowledge 28 in the knowledge base file 4 into the knowledge information catalog 5 and to store the module of knowledge 28 into the knowledge base file 4 as it is. With this processing, the contents of the knowledge information catalog 5 take the form of a table 36 shown in FIG. 5B. In the table 36, reference numeral 37 represents a record additionally registered in the knowledge information catalog 5 with an inherit object name being "mammal" and a class name being "human".

Figure 4B:
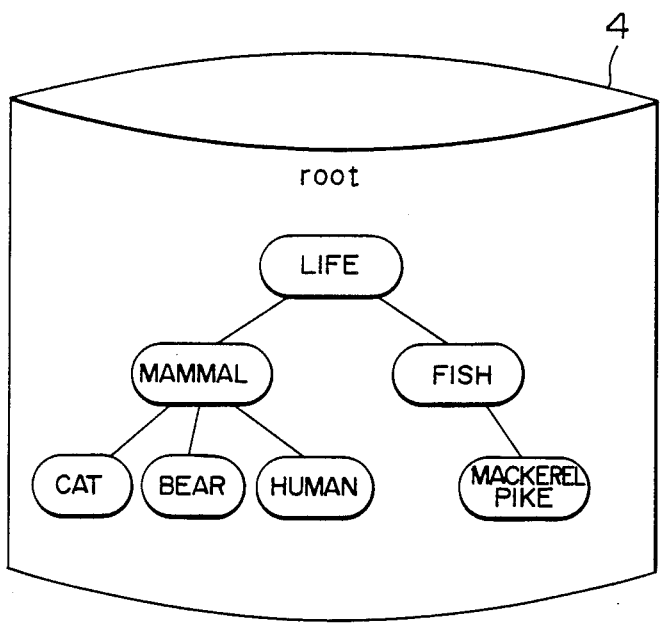

With the above-mentioned processing, the contents of the knowledge base file 4 are updated or restructured from the hierarchical structure of FIG. 4A to a hierarchical structure shown in FIG. 4B. Namely, the hierarchical or tree structure is changed into one in which the module of knowledge 28 concerning "human" is additionally connected or chained to the rank subsequent to the module of knowledge 42 of "mammal".

The above explanation has been provided for the case where a module of knowledge having a classificatorily settled inheritance or hierarchical relation in terms of higher or lower rank is stored into the knowledge base file 4 as knowledge lower in rank than the parent referred to as a "root". However, parentless or orphaned module of knowledge may also be stored into the knowledge base file 4. An assembly or group of such modules of knowledge are stored into the knowledge base file 4 as parentless knowledge called an "orphan" or as an ancestry having an unsettled relation in inheritance. Next, explanation will be made of the case where the orphaned module of knowledge is stored.

Figure 7A:
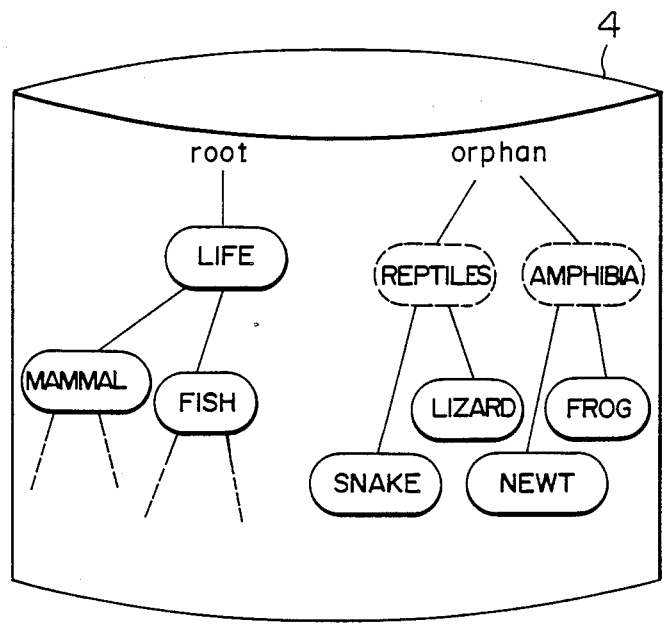
FIGS. 7A and 7B are views showing further examples of the structure of the knowledge base file before and after a change thereof.

Provided that the knowledge base file 4 has contents as shown in FIG. 7A, that is, a module of knowledge 53 of "snake" and a module of knowledge 54 of "lizard" are registered as an orphaned module of knowledge with a structure as shown, the knowledge base manager 3 operates to produce in the knowledge information catalog 5 a table 44 for the orphaned module of knowledge having contents as shown in FIG. 8A in addition to a root table 46 having contents as shown in FIG. 8B. The table 44 is called an orphan table and has the same format as the root table 46.

Now, consider the case where a module of knowledge 31 having contents as shown in FIG. 6B is to be stored into the knowledge base file 4 when the knowledge base file 4 and the knowledge information catalog 5 are in their states as mentioned above. In such a case, the knowledge representation analyzer 6 in the knowledge base manager 3 extracts an inherit object name 33 of "life" and a class name 32 of "reptiles" from the module of knowledge 31. Next, the system control processor 7 refers to the knowledge information catalog 5 by virtue of the extracted inherit object name "life" to search the low rank columns in the root table 46, thereby determining whether or not any module of knowledge higher in rank than the module of knowledge 31 exists in the knowledge base file 4.

Figure 9:
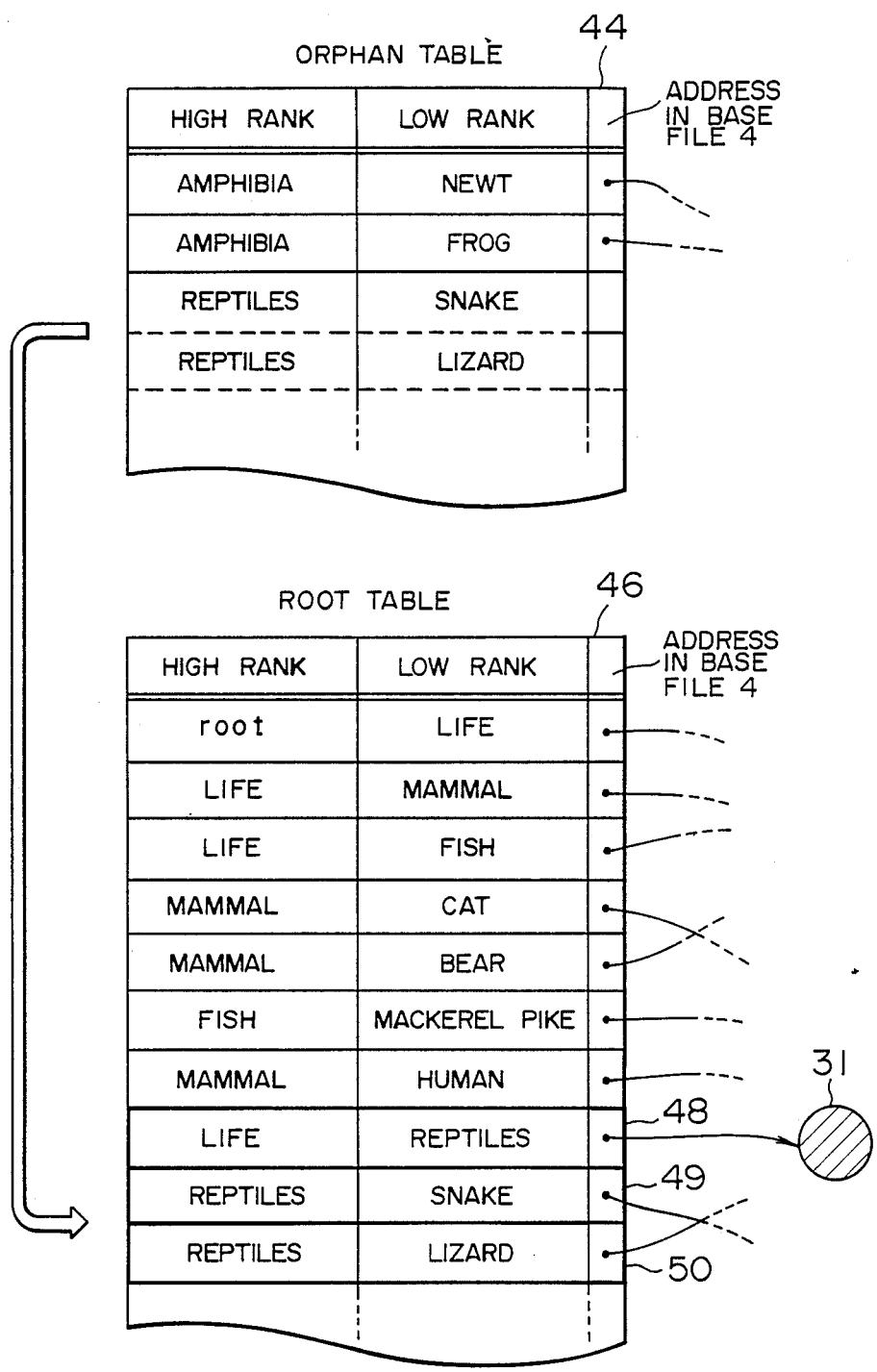
FIG. 9 is a view for explaining the restructuring or updating of the contents of knowledge information catalogs.

In the present embodiment, since there is a module of knowledge higher in rank than the module of knowledge 31, a knowledge information record 48 of the module of knowledge 31 is additionally registered into the root table 46 as shown in FIG. 9 while the module of knowledge 31 is stored into the knowledge base file 4.

The system control processor 7 further searches the high rank columns in the orphan table 44 by virtue of the extracted class name "reptiles" to examine whether or not any module of knowledge lower in rank than the module of knowledge "reptiles" exists. In the present embodiment, module of knowledge "snake" and module of knowledge "lizard" are located in the orphan table 44. Then, as shown in FIG. 9, records of the module of knowledge for "snake" and "lizard" are deleted from the orphan table 44 and are thereinstead registered into the root table 46 additionally as records 49 and 50.

Figure 7B:
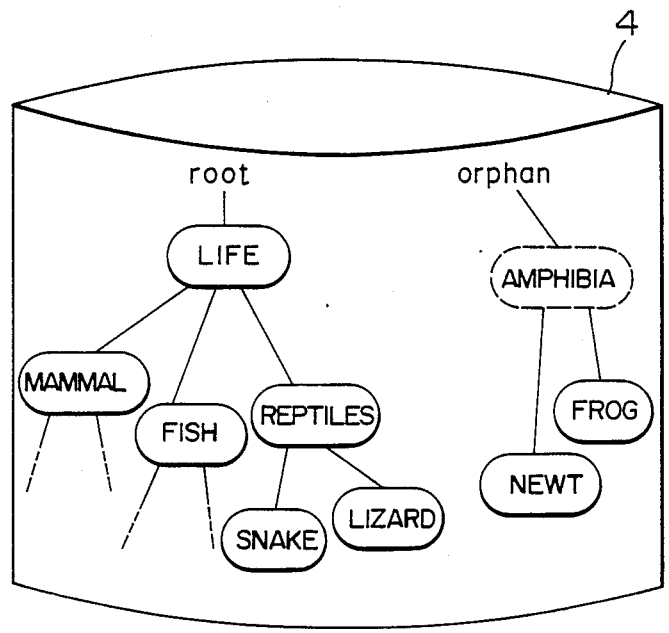

In this manner, the knowledge base manager 3 causes the module of knowledge 31 to be stored into the knowledge base file 4, while automatically referring to and updating or reorganizing the knowledge information catalogs 5 and, as a result, the structure of the knowledge base file 4 is logically reorganized from the state shown in FIG. 7A to a state shown in FIG. 7B. Alternatively, the manager 3 may physically store the module of knowledge 31 into a corresponding one of a plurality of file units included in the file 4, depending on updating of the knowledge base catalog 5.

The conventional expert system structuring tool is a tool in which a module of knowledge inputted by a user is subjected to analysis to determine a relation of the inputted module of knowledge to another module of knowledge, as is disclosed in pages 132-133 of the annex of Nikkei Computer published on Nov. 11, 1985. In this tool, since the storage of a module of knowledge and the analysis of a relation of the module of knowledge to another module of knowledge are processed as separate jobs, the module of knowledge inputted by the user is stored into a knowledge base file in the form of a mere file, namely, without any relation with any module of knowledge in the knowledge base file. Therefore, when it is desired to perform the analysis of any relation of the module of knowledge inputted by the user to any module of knowledge already existing in the knowledge base file and subsequently to restructure the knowledge base file on the basis of the results of analysis, the execution of analysis and the execution of restructuring must be commanded by the user. In that case, it is necessary to load the whole contents of the knowledge base file into a memory of the tool.

On the other hand, in the knowledge base manager 3 according to the present invention, the storage of a module of knowledge and the analysis of a relation of the module of knowledge to another module of knowledge are simultaneously and automatically performed in accordance with a program, thereby performing a desired or required restructuring (or updating) of the knowledge base file. This updating process can be performed on the knowledge information catalog 5 effectively without any need of loading the contents of the knowledge base file.

As is apparent from the foregoing, according to the present invention, the flexibility and extentibility of the knowledge base management system for knowledge representing languages or programming languages can be improved greatly by additionally providing a knowledge representation analyzer and a knowledge base catalog for every programming language.

I claim:

1. A knowledge base management method in an expert system including a knowledge base file, an input/output device for inputting/outputting a module of knowledge or text described by one of a plurality of different languages representing knowledge, and a control processor connected to said input/output device and said knowledge base file for controlling the storing/reading of a module of knowledge specified by said input/output device into/from said knowledge base file, comprising:

a first step of performing knowledge analysis of an input module of knowledge to be stored in the knowledge base file, inclusive of verbal, syntactic and semantic analyses thereof, for a language representing knowledge by which the input module of knowledge is described, to extract information concerning a knowledge relationship between the input module of knowledge and a module of knowledge already stored in the knowledge base file from the input module of knowledge; and a second step of creating a knowledge information catalog for every language representing knowledge using said control processor so that extracted knowledge relationship information is stored into the knowledge information catalog along with information concerning a storage location of the input module of knowledge in said knowledge base file, and storing the input module of knowledge into said knowledge base file at said storage location using said control processor.

2. A knowledge base management method according to claim 1, wherein in said first step, hierarchical information concerning a hierarchical relationship between an inputted module of knowledge and a module of knowledge already stored in said knowledge base file is extracted as knowledge relation information in a classified manner, and in said second step, reference to a knowledge information catalog is made so that extracted hierarchical relationship information is stored together with a storage address of the module of knowledge in said knowledge base file in a paired form as a hierarchy-settled catalog table representative of the assembly of hierarchical information of modules of knowledge having a settled hierarchical relation therebetween and is otherwise stored together with said storage address as a hierarchy-unsettled catalog table representative of the assembly of hierarchical relation information of modules of knowledge having an unsettled hierarchical relation therebetween when the extracted hierarchical relation information is not present in said hierarchy-settled catalog table.

3. A knowledge base management method according to claim 2, wherein said second step includes comparing hierarchical relation information in said hierarchy-unsettled catalog table with hierarchical relation information in said hierarchy-settled catalog table and incorporating the former hierarchical relation information into said hierarchy-settled catalog table to restructure the hierarchy-settled catalog table when it is found as a result of said comparing that the hierarchical relation information in said hierarchy-unsettled catalog table can be specifically identified as hierarchical relation information in said hierarchy-settled catalog table.

4. A knowledge base management method in an expert system including at least one knowledge base file, an input/output device for inputting/outputting modules of knowledge, and a processor for controlling the reading/writing of modules of knowledge specified by said input/output device, comprising:

a step of inputting a module of knowledge described by a specified language representing knowledge as received from said input/output device for storage of said module of knowledge into said knowledge base file;

a step of analyzing said inputted module of knowledge in accordance with a predetermined language representing knowledge analysis program to extract therefrom information concerning a knowledge inheritance relationship between the inputted module of knowledge and a module of knowledge already stored in said knowledge base file; and a step of registering extracted inheritance relationship information along with a storage address of the inputted module of knowledge in said knowledge base file while storing the inputted module of knowledge into said knowledge base file.

5. A knowledge base management system, comprising: an input/output device for inputting/outputting modules of knowledge described by different language representing knowledge, at least one knowledge base file, a control processor connected between said input/output device and said knowledge base file, a plurality of language representation knowledge analyzing means provided individually for a respective language representing knowledge and independently of said control processor for analyzing a relationship between an input module of knowledge described by the language representing knowledge and a module of knowledge already stored in said knowledge base file, and a plurality of knowledge information catalogs provided individually for the knowledge representing languages and independently of said control processor for storing knowledge information obtained through the analyses by said language representation knowledge analyzing means with relation to storage locations of a module of knowledge in said knowledge base file, in which when one module of knowledge described by any given language representing knowledge is to be stored into said knowledge base file, the analysis of this module of knowledge is made by one of said plurality of language representation knowledge analyzing means corresponding to said given language representing knowledge and knowledge information obtained by the analysis is stored into one of said plurality of knowledge information catalogs corresponding to said given language representing knowledge.

6. A knowledge base management system according to claim 5, wherein each of said plurality of language representation knowledge analyzing means performs verbal, syntactic and semantic analyses of a module of knowledge inputted thereto and outputs knowledge relation information concerning a relation in inheritance between the inputted module of knowledge and a module of knowledge already stored in said knowledge base file in a classified manner.

7. A knowledge base management system according to claim 6, wherein each of said plurality of knowledge information catalogs includes a table from/into which knowledge information can be read/written by said control processor, and said control processor includes means for reading the knowledge information from said table or the module knowledge from said knowledge base file in accordance with a read command from said input/output device.

* * * * *